United States Patent
Banno et al.

(10) Patent No.: US 6,662,129 B2
(45) Date of Patent: Dec. 9, 2003

(54) SYSTEM FOR DETECTING A SENSOR ERROR

(75) Inventors: Masaki Banno, Nagoya (JP); Shiro Monzaki, Mishima (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/163,580

(22) Filed: Jun. 7, 2002

(65) Prior Publication Data

US 2003/0000308 A1 Jan. 2, 2003

(30) Foreign Application Priority Data

Jun. 7, 2001  (JP) ..................... 2001-173056

(51) Int. Cl.[7] .............................................. G01D 18/00
(52) U.S. Cl. ............................ 702/87; 702/116; 701/70
(58) Field of Search ..................... 702/87, 116, 141; 701/70; 73/510; 714/704, 576; 324/207.14

(56) References Cited

U.S. PATENT DOCUMENTS 6,055,841 A  *  5/2000 Yamada et al. .............. 73/1.38
6,122,538 A  *  9/2000 Sliwa et al. ................ 600/407
6,430,714 B1 *  8/2002 McAdam et al. ........... 714/704

FOREIGN PATENT DOCUMENTS

JP          7-83951 A           3/1995

* cited by examiner

*Primary Examiner*—Kamini Shah
(74) *Attorney, Agent, or Firm*—Burns, Doane, Swecker & Mathis, LLP

(57) ABSTRACT

If a difference between a value evaluated by prorating a sum of an average value of a signal outputted from a signal processing portion within a second predetermined time before a start of a pseudo drive and an average value of the signal outputted from the signal processing portion within a third predetermined time after an end of the pseudo drive, and an average value of the signal outputted from the signal processing portion within a first predetermined time from the start to the end of the pseudo drive does not fall within a predetermine value, the sensor error is determined.

9 Claims, 4 Drawing Sheets

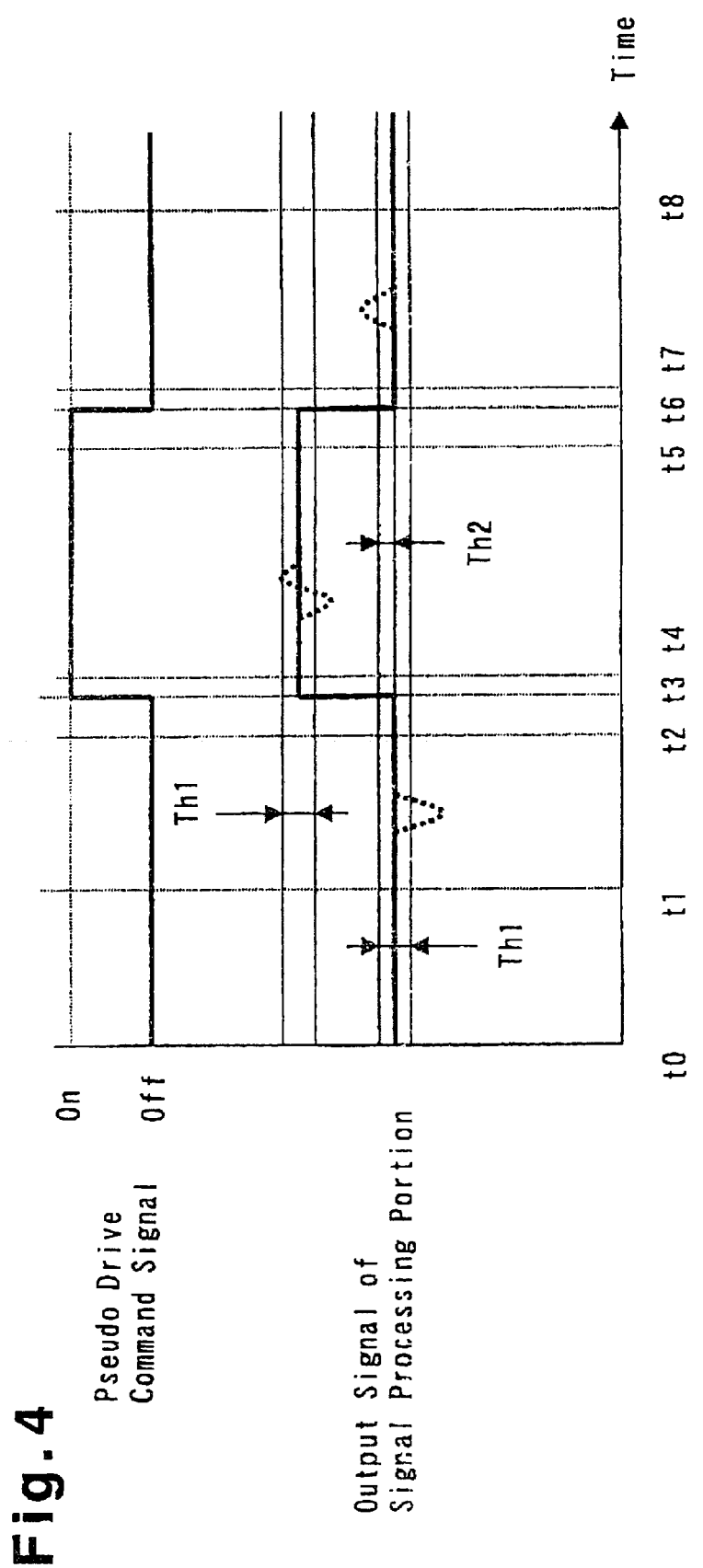

SYSTEM FOR DETECTING A SENSOR ERROR

This application is based on and claims priority under 35 U.S.C. §119 with respect to Japanese Application No. 2001-173056 filed on Jun. 7, 2001, the entire content of which is incorporated herein by reference.

1. Field of the Invention

This invention generally relates to a system for detecting a sensor error. More particularly, the present invention pertains to a system for detecting a sensor error of such as an acceleration sensor and an angular velocity sensor used for detecting such as longitudinal acceleration of a vehicle and yaw rate.

2. Background of the Invention

Japanese Patent Laid-Open Publication No. H07-83951 discloses an angular velocity sensor having a self-diagnosis feature. This angular velocity sensor includes a detecting element portion, a signal processing circuit portion for processing output from the detecting element portion, and an electromagnetic generating portion provided close to the detecting element portion for activating the detecting element portion. In the disclosed angular sensor, the error is detected by checking the output from the signal processing circuit portion produced by activating the detecting element portion by the electromagnetic generating portion to provide a pseudo Coriolis force to the element under the condition that no angular velocity is inputted to the detecting element portion. In this angular velocity sensor, if an output producing portion of a pseudo detecting element portion, which produces the output from the pseudo detecting element portion being inputted to the signal processing circuit portion, is provided instead of the electromagnetic generating portion, the error in the signal processing circuit portion can be detected though the error in the detecting element portion cannot be detected.

In the system disclosed in the Japanese Patent Laid-Open Publication No. H07-83951, the output from the signal processing circuit portion is checked only when the detecting element portion is activated by the electromagnetic generating portion. Accordingly, if the angular velocity is actually inputted while the self-diagnosis is executed, the sensor error can be determined even though no errors exist in the angular velocity sensor, which leads to the dissatisfaction with the detecting accuracy.

SUMMARY OF THE INVENTION

It is an object of the present invention to provide a higher accuracy for detecting a sensor error.

According to the present invention, the system for detecting the sensor error includes a sensor having a detecting portion and a signal processing portion, and the error is detected in this system based on a signal outputted from the signal processing portion by performing a pseudo drive either by providing a pseudo external input to the detecting portion or by providing a pseudo detecting portion output signal to the signal processing portion under the condition that an external input is not inputted to the detecting portion. In this system, firstly, an average value of the signal outputted from the signal processing portion within a first predetermined time from a start to an end of the pseudo drive, an average value of the signal outputted from the signal processing portion within a second predetermined time before the start of the pseudo drive, and an average value of the signal outputted from the signal processing portion within a third predetermined time after the end of the pseudo drive are evaluated. Then, if a difference between a value evaluated by prorating a sum of the above average value of the signal outputted from the signal processing portion within the second predetermined time before the start of the pseudo drive and the above average value of the signal outputted from the signal processing portion within the third predetermined time after the end of the pseudo drive, and the above average value of the signal outputted from the signal processing portion within the first predetermined time from the start to the end of the pseudo drive does not fall within a predetermined value, then the sensor error is determined.

Accordingly, in this invention, the sensor error is determined if the difference between the value evaluated by prorating the sum of the average value outputted from the signal processing portion within the second predetermined time before the start of the pseudo drive and the average value outputted from the signal processing portion within the third predetermined time after the end of the pseudo drive, and the average value outputted from the signal processing portion within the first predetermined time from the start to the end of the pseudo drive does not fall within the predetermined value. Then, if the external input is actually inputted under the condition that the external input to the detecting portion is not supposed to be inputted, the influence of the external input appears on the output from the signal processing portion before and after the pseudo drive. Accordingly, by determining the sensor error based on the output from the signal processing portion during the pseudo drive and before and after thereof, the detecting accuracy is more improved.

In this invention, if each fluctuation of the signal outputted from the signal processing portion from the start to the end of the pseudo drive, the signal outputted from the signal processing portion within the second predetermined time before the start of the pseudo drive, and the signal outputted from the signal processing portion within the third predetermined time after the end of the pseudo drive does not fall within a predetermined fluctuation range, and/or, a deviation of the average value of the signal outputted from the signal processing portion within the second predetermined time before the start of the pseudo drive from the average value of the signal outputted from the signal processing portion within the third predetermined time after the end of the pseudo drive is greater than a predetermined value, the error determination may not be performed. In this case, the predetermined fluctuation range is set so that the fluctuation of the output from the signal processing portion goes beyond the predetermined range if the external input is inputted under the normal sensor condition. The fluctuation range is experimentally evaluated. Also the predetermined value is set so that the above-mentioned deviation cannot exceed the predetermined value due to the normal sensor characteristic change caused by the pseudo drive under the normal sensor condition. The predetermined value is also experimentally evaluated.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 4 is a time chart showing an action of this invention.

DETAILED DESCRIPTION OF THE INVENTION

Figure 1:
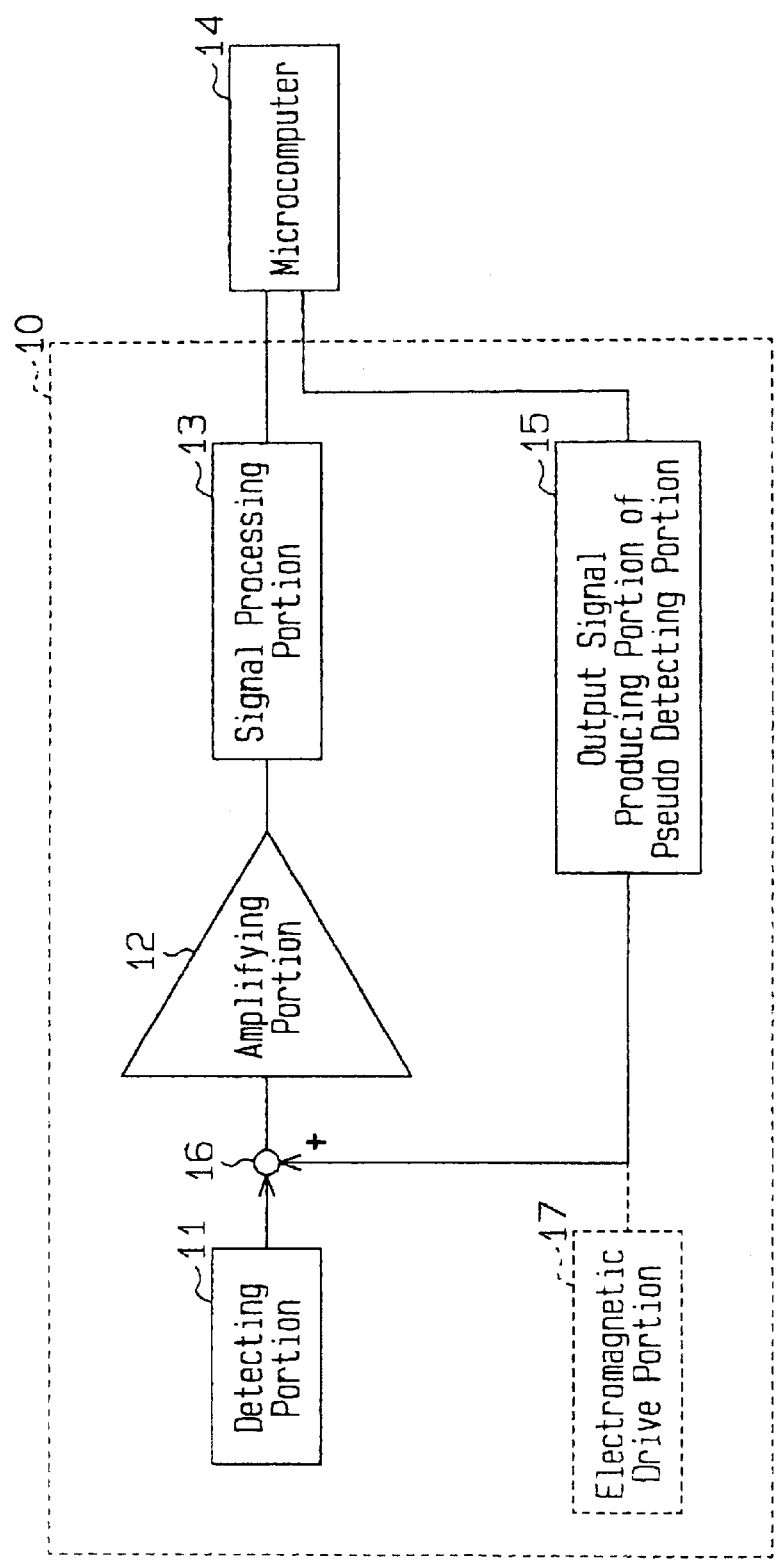
FIG. 1 is a diagram showing an overall configuration of an angular velocity sensor as a yaw-rate sensor for a vehicle and an error detection device thereof according to an embodiment of this invention.

FIG. 1 shows an overall configuration of an angular velocity sensor as a yaw rate sensor for a vehicle and an error detection device thereof according to an embodiment of this invention. In FIG. 1, an angular velocity sensor 10 is provided with a detecting portion 11 having a tuning fork structure, an amplifying portion 12 amplifying an analog signal from the detecting portion 11, and a signal processing portion 13 converting an output signal amplified at the amplifying portion 12 into a digital signal being inputted to a microcomputer 14. The angular velocity sensor is also provided with an output signal producing portion of a pseudo detecting portion 15 producing a pseudo detecting portion output signal (analog signal) in response to a pseudo drive command signal from the microcomputer 14, and a summing portion 16 adding the pseudo detecting portion output signal from the output signal producing portion of the pseudo detecting portion 15 to the analog signal from the detecting portion 11. The microcomputer 14 calculates the yaw rate based on the digital signal from the signal processing portion 13. The microcomputer 14 also determines whether the vehicle is under a stopped condition based on the signals from such as a vehicle speed sensor not shown in FIG. 1. If the microcomputer 14 determines that the vehicle is stopped, the pseudo drive command signal is outputted from the microcomputer 14 as shown in FIG. 4. A time when the vehicle is determined to be stopped corresponds to a time to in FIG. 4, and the pseudo drive command signal is outputted during a period from a time t3 to a time t6. The microcomputer 14 performs the sensor error determination procedure to detect the error in the amplifying portion 12 and the signal processing portion 13 of the angular velocity sensor 10.

Figure 2:
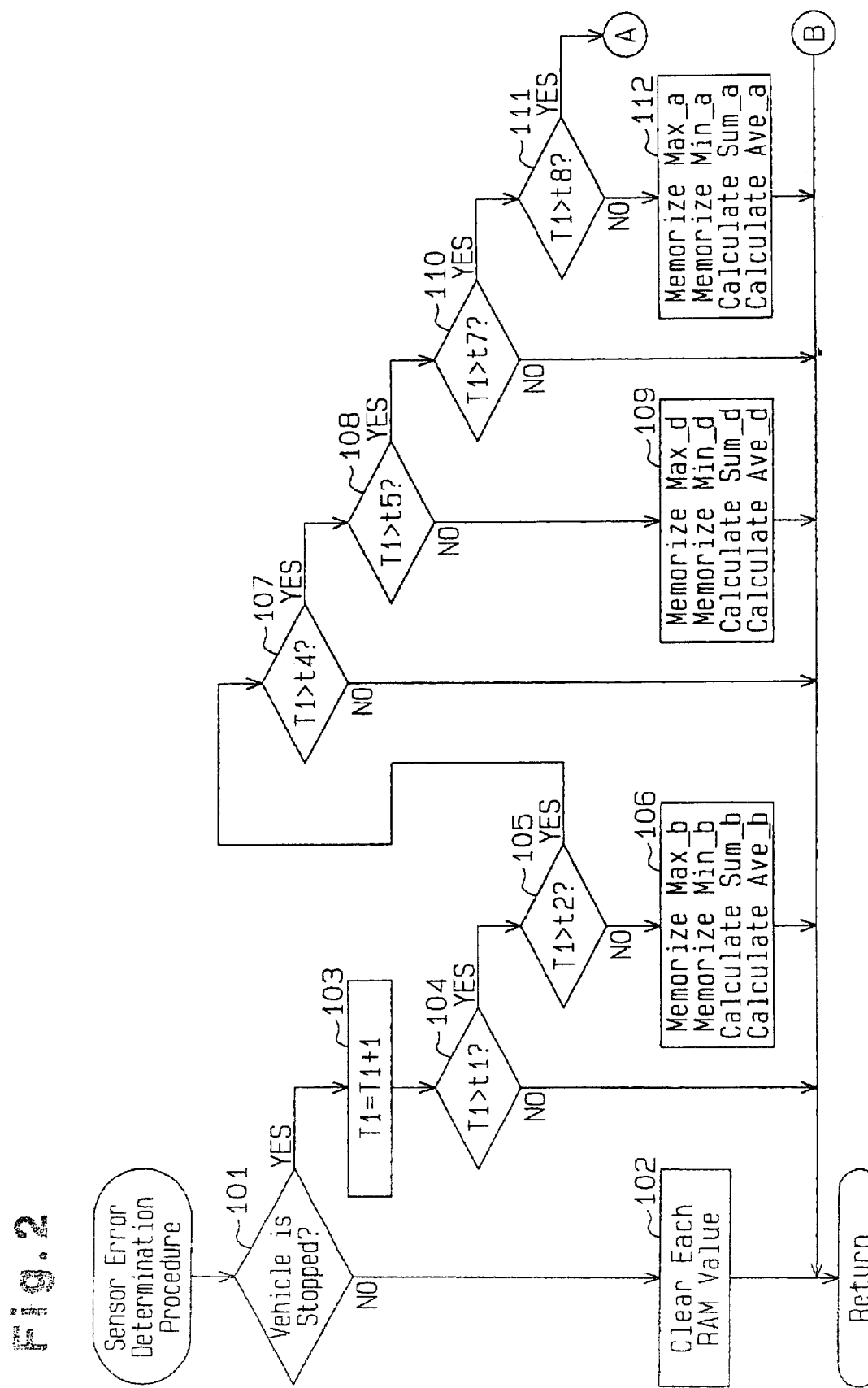
FIG. 2 is a flowchart showing a sensor error determination procedure of a microcomputer shown in FIG. 1.
Figure 3:
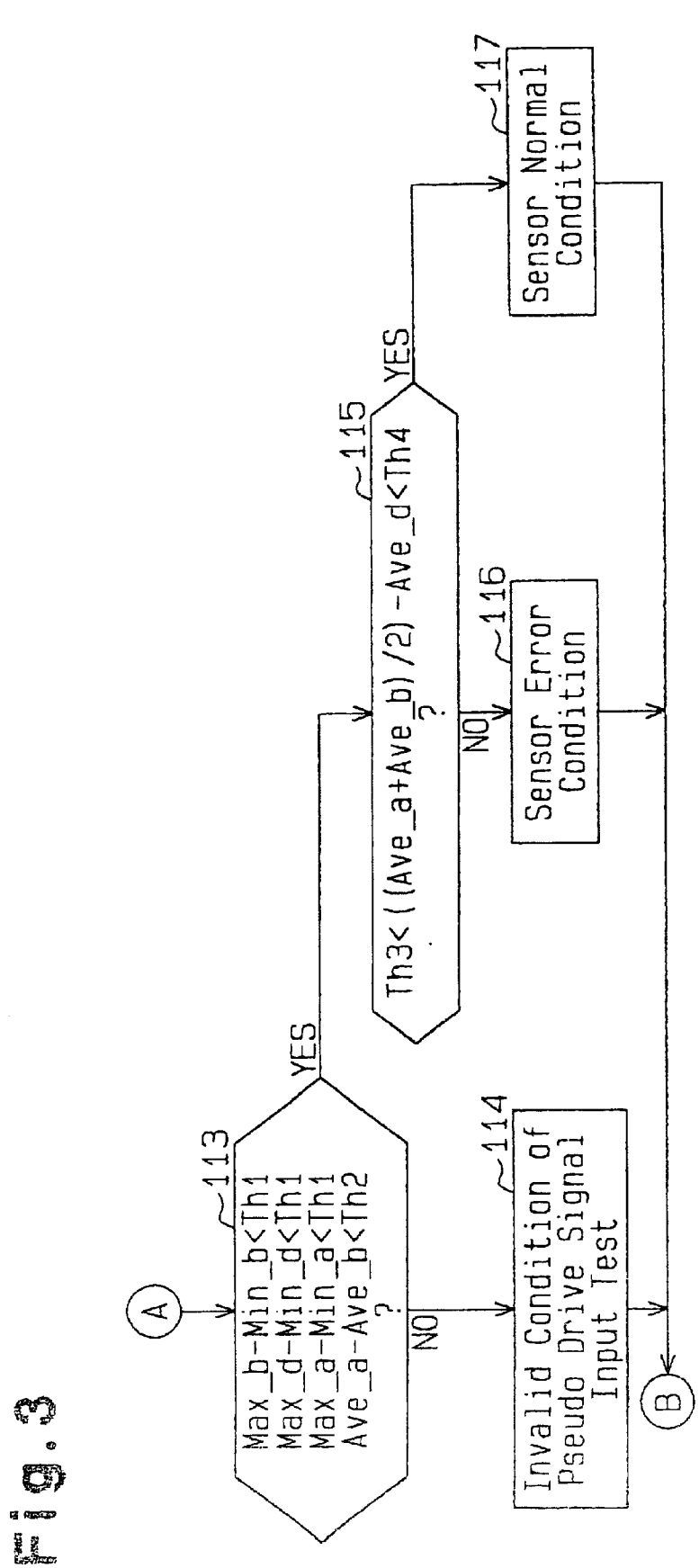
FIG. 3 is a flowchart showing the sensor error determination procedure of the microcomputer shown in FIG. 1.

Flowcharts in FIGS. 2 and 3 show details of the sensor error determination procedure which the microcomputer 14 performs. First, in FIGS. 2 and 3, it is determined whether the vehicle is stopped in Step 101. If the vehicle is determined to be not stopped, then the process is advanced to Step 102 in which each RAM value memorizing various operation values temporarily is cleared. If the vehicle is determined to be stopped, the process is advanced to Step 103 in which a timing counter value T1 is renewed by adding 1. Then, in Step 104, it is determined whether T1 exceeds t1 (refer to FIG. 4). If T1 exceeds t1, the process is advanced to Step 105 in which it is determined whether T1 exceeds t2 (refer to FIG. 4).

If T1 does not exceed t2, the process is advanced to Step 106 in which a maximum value Max_b and a minimum value Min_b of the output from the signal processing portion 13 are memorized and an integrated value Sum_b of the output from the signal processing portion 13 is calculated. Also an average value Ave_b is calculated from the Sum_b (Sum_b/t2–t1). If T1 exceeds t2, the process is advanced to Step 107 in which it is determined whether T1 exceeds t4 (refer to FIG. 4).

If T1 exceeds t4, the process is advanced to Step 108 in which it is determined whether T1 exceeds t5 (refer to FIG. 4). If T1 does not exceed t5, the process is advanced to Step 109 in which a maximum value Max_d and a minimum value Min_d of the output from the signal processing portion 13 are memorized and an integrated value Sum_d of the output from the signal processing portion 13 is calculated. Also an average value Ave_d is calculated from the Sum_d (Sum_d/t5–t4). If T1 exceeds t5, the process is advanced to Step 110 in which it is determined whether T1 exceeds t7 (refer to FIG. 4).

If T1 exceeds t7, the process is advanced to Step 111 in which it is determined whether T1 exceeds t8 (refer to FIG. 4). If T1 does not exceed t8, the process is advanced to Step 112 in which a maximum value Max_a and a minimum value Min_a of the output from the signal processing portion 13 are memorized and an integrated value Sum_a of the output from the signal processing portion 13 is calculated. Also an average value Ave_a is calculated from the Sum_a (Sum_a/t8–t7). If T1 exceeds t8, the process is advanced to Step 113 in which it is determined whether a value evaluated by subtracting the minimum value Min_b from the maximum value Max_b, a value evaluated by subtracting the minimum value Min_d from the maximum value Max_d, and a value evaluated by subtracting the minimum value Min_a from the maximum value Max_a are less than a predetermined value Th1 (refer to FIG. 4) respectively. At the same time, it is determined whether a value evaluated by subtracting the average value Ave_b from the average value Ave_a (a deviation of the average value, Ave_a from the average value Ave_b) is less than a predetermined value Th2 (refer to FIG. 4). If each result is not less than each predetermined value, the process is advanced to Step 114 in which an invalid condition is set for a pseudo drive signal input test. If each result is less than each predetermined value, the process is advanced to Step 115 in which it is determined whether a difference between an average value of the average values Ave_a and Ave_b (Ave_a+Ave_b/2) and the average value Ave_d is greater than a predetermined value Th3 but less than a predetermined value Th4. If the result does not satisfy this condition, the process is advanced to Step 116 in which the sensor error condition is set. If the result satisfies this condition, the process is advanced to Step 117 in which the sensor normal condition is set.

The predetermined value Th1 is set so that the fluctuation of the output from the signal processing portion 13 goes beyond the predetermined value Th1 when the external input is inputted under the normal condition of the detecting portion 11, the amplifying portion 12 and the signal processing portion 13. The predetermined value Th1 is experimentally evaluated. Also the predetermined value Th2 is set so that the deviation of the average value Ave_a from the average value Ave_b cannot exceed the predetermined value Th2 due to the normal sensor characteristic change caused by the pseudo drive under the normal condition of the detecting portion 11, the amplifying portion 12 and the signal processing portion 13. The predetermined value Th2 is experimentally evaluated. In addition, the predetermined values Th3 and Th4 are set so that the output from the signal processing portion 13 exists between the predetermined values Th3 and Th4 when the pseudo drive is executed under the normal condition of the detecting portion 11, the amplifying portion 12 and the signal processing portion 13. The predetermined values Th3 and Th4 are also experimentally evaluated.

FIG. 4 is a time-chart showing changes of the pseudo drive command signal outputted from the microcomputer 14 and the output signal from the signal processing portion 13. In the time-chart, dashed line portions of the output signal from the signal processing portion 13 show a change caused by an influence of the external input to the detecting portion 11.

In FIG. 1, instead of the output signal producing portion of the pseudo detecting portion 15 and the summing portion 16, an electromagnetic drive portion 17 and a drive signal producing portion can be provided. The electromagnetic drive potion 17 activates the detecting portion 11 and the drive signal producing portion produces the drive signal of the electromagnetic drive portion 17 in response to the pseudo drive command signal from the microcomputer 14. By so doing, errors in the detecting portion 11, the amplifying portion 12 and the signal processing portion 13 can be detected. In addition, the detecting portion 11 can be provided to detect such as the acceleration.

As explained above, in this invention, the sensor error is determined if a difference between a value evaluated by prorating a sum of an average value outputted from the signal processing portion within a second predetermined time before the start of the pseudo drive and an average value outputted from the signal processing portion within a third predetermined time after the end of the pseudo drive, and an average value outputted from the signal processing portion within a first predetermined time from the start to the end of the pseudo drive does not fall within a predetermined value. Then, if the external input is actually inputted under the condition that the external input to the detecting portion is not supposed to be inputted, the influence thereof appears on the output from the signal processing portion before and after the pseudo drive. Accordingly, by determining the sensor error based on the output from the signal processing portion during the pseudo drive and before and after thereof, the detecting accuracy is more improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A system for detecting a sensor error comprising:
   a sensor having a detecting portion and a signal processing portion; and means for detecting the sensor error based on a signal outputted from the signal processing portion by performing a pseudo drive by providing a pseudo external input to the detecting portion, under a condition that an external input is not inputted to the detecting portion; wherein an average value of the signal outputted from the signal processing portion within a first predetermined time from a start to an end of the pseudo drive, an average value of the signal outputted from the signal processing portion within a second predetermined time before the start of the pseudo drive, and an average value of the signal outputted from the signal processing portion within a third predetermined time after the end of the pseudo drive are evaluated and the sensor error is determined if a difference between a value evaluated by prorating a sum of said average value of the signal outputted from the signal processing portion within the second predetermined time before the start of the pseudo drive and said average value of the signal outputted from the signal processing portion within the third predetermined time after the end of the pseudo drive, and said average value of the signal outputted from the signal processing portion within the first predetermined time from the start to the end of the pseudo drive does not fall within a predetermined value.

2. A system for detecting a sensor error according to claim 1, wherein the sensor error is determined by the difference between the value evaluated by dividing the sum of the average value of the signal outputted from the signal processing portion within the second predetermined time before the start of the pseudo drive and the average value of the signal outputted from the signal processing portion within the third predetermined time after the end of the pseudo drive, and the average value of the signal outputted from the signal processing portion within the first predetermined time from the start to the end of the pseudo drive not falling within the predetermined value.

3. A system for detecting a sensor error according to claim 1, wherein when each fluctuation of the signal outputted from the signal processing portion from the start to the end of the pseudo drive, the signal outputted from the signal processing portion within the second predetermined time before the start of the pseudo drive, and the signal outputted from the signal processing portion within the third predetermined time after the end of the pseudo drive does not fall within a predetermined fluctuation range and/or a deviation of the average value of the signal outputted from the signal processing portion within the second predetermined time before the start of the pseudo drive from the average value of the signal outputted from the signal processing portion within the third predetermined time after the end of the pseudo drive is greater than a predetermined value, a determination of the sensor error is not performed.

4. A system for detecting a sensor error comprising:
   means for detecting the sensor error based on a signal outputted from a signal processing portion by performing a pseudo drive by providing a pseudo detecting portion output signal to a signal processing portion under a condition that an external input is not inputted to a detecting portion; wherein an average value of the signal outputted from the signal processing portion within a first predetermined time from a start to an end of the pseudo drive, an average value of the signal outputted from the signal processing portion within a second predetermined time before the start of the pseudo drive, and an average value of the signal outputted from the signal processing portion within a third predetermined time after the end of the pseudo drive are evaluated and the sensor error is determined if a difference between a value evaluated by prorating a sum of said average value of the signal outputted from the signal processing portion within the second predetermined time before the start of the pseudo drive and said average value of the signal outputted from the signal processing portion within the third predetermined time after the end of the pseudo drive, and said average value of the signal outputted from the signal processing portion within the first predetermined time from the start to the end of the pseudo drive not falling within a predetermined value.

5. A system for detecting a sensor error according to claim 4, wherein the sensor error is determined by the difference between the value evaluated by dividing the sum of the average value of the signal outputted from the signal processing portion within the second predetermined time before the start of the pseudo drive and the average value of the signal outputted from the signal processing portion within the third predetermined time after the end of the pseudo drive, and the average value of the signal outputted from the signal processing portion within the first predetermined time from the start to the end of the pseudo drive not falling within the predetermined value.

6. A system for detecting a sensor error according to claim 4, wherein when each fluctuation of the signal outputted from the signal processing portion from the start to the end of the pseudo drive, the signal outputted from the signal processing portion within the second predetermined time before the start of the pseudo drive, and the signal outputted from the signal processing portion within the third predetermined time after the end of the pseudo drive does not fall within a predetermined fluctuation range and/or a deviation of the average value of the signal outputted from the signal processing portion within the second predetermined time before the start of the pseudo drive from the average value of the signal outputted from the signal processing portion within the third predetermined time after the end of the pseudo drive is greater than a predetermined value, a determination of the sensor error is not performed.

7. Method for detecting a sensor error using a system including a sensor having a detecting portion and a signal processing portion, the method comprising the steps of:

obtaining an average value of a signal outputted from the signal processing portion within a first predetermined time from a start to an end of a pseudo drive;

obtaining an average value of the signal outputted from the signal processing portion within a second predetermined time before the start of the pseudo drive;

obtaining an average value of the signal outputted from the signal processing portion within a third predetermined time after the end of the pseudo drive;

calculating a difference between a value evaluated by prorating a sum of said average value of the signal outputted from the signal processing portion within the second predetermined time before the start of the pseudo drive and said average value of the signal outputted from the signal processing portion within the third predetermined time after the end of the pseudo drive, and said average value of the signal outputted from the signal processing portion within the first predetermined time from the start to the end of the pseudo drive; and determining the sensor error based on said difference not falling within a predetermined value.

8. Method for detecting a sensor error using a system including a sensor having a detecting portion and a signal processing portion according to claim 7, wherein the sensor error is determined by the difference between the value evaluated by dividing the sum of the average value of the signal outputted from the signal processing portion within the second predetermined time before the start of the pseudo drive and the average value of the signal outputted from the signal processing portion within the third predetermined time after the end of the pseudo drive, and the average value of the signal outputted from the signal processing portion within the first predetermined time from the start to the end of the pseudo drive not falling within the predetermined value.

9. Method for detecting a sensor error using a system including a sensor having a detecting portion and a signal processing portion according to claim 7, wherein when each fluctuation of the signal outputted from the signal processing portion from the start to the end of the pseudo drive, the signal outputted from the signal processing portion within the second predetermined time before the start of the pseudo drive, and the signal outputted from the signal processing portion within the third predetermined time after the end of the pseudo drive does not fall within a predetermined fluctuation range and/or a deviation of the average value of the signal outputted from the signal processing portion within the second predetermined time before the start of the pseudo drive from the average value of the signal outputted from the signal processing portion within the third predetermined time after the end of the pseudo drive is greater than a predetermined value, a determination of the sensor error is not performed.

* * * * *